(12) United States Patent
Ye et al.

(10) Patent No.: US 12,358,380 B2
(45) Date of Patent: Jul. 15, 2025

(54) PRE-CHARGE APPARATUS AND CONTROL METHOD

(71) Applicant: InventChip Technology Co., Ltd., Shanghai (CN)

(72) Inventors: Zhong Ye, Plano, TX (US); Yi Yang, Shanghai (CN)

(73) Assignee: InventChip Technology Co., Ltd., Shanghai (CN)

( * ) Notice: Subject to any disclaimer, the term of this patent is extended or adjusted under 35 U.S.C. 154(b) by 778 days.

(21) Appl. No.: 17/657,137

(22) Filed: Mar. 30, 2022

(65) Prior Publication Data

US 2023/0302921 A1 Sep. 28, 2023

(30) Foreign Application Priority Data

Mar. 9, 2022 (CN) .......................... 202210225212.4

(51) Int. Cl.
*B60L 50/40* (2019.01)
*H02J 7/16* (2006.01)

(52) U.S. Cl.
CPC ................ *B60L 50/40* (2019.02); *H02J 7/16* (2013.01)

(58) Field of Classification Search
CPC ........................................................ B60L 50/40
USPC ........................................................... 320/165
See application file for complete search history.

(56) References Cited

U.S. PATENT DOCUMENTS

| | | | |
|---|---|---|---|
| 9,925,878 B2 * | 3/2018 | Hashim ................... | B60L 15/08 |
| 2009/0295224 A1 * | 12/2009 | Kobayashi .............. | B60L 50/40 |
| | | | 307/9.1 |
| 2015/0251542 A1 * | 9/2015 | Mensah-Brown ...... | B60L 50/40 |
| | | | 307/10.1 |
| 2020/0122582 A1 * | 4/2020 | Curuvija ................. | B60L 50/40 |

* cited by examiner

*Primary Examiner* — Jerry D Robbins
(74) *Attorney, Agent, or Firm* — AP3 Law Firm PLLC (57) ABSTRACT

An apparatus includes a power converter configured to provide a constant current charge to a capacitor coupled to a high voltage bus through a mechanical contact, an isolation interface configured to receive a pre-charge signal on a primary side of the isolation interface, and convert the pre-charge signal into a bias voltage signal and a control command signal on a secondary side of the isolation interface, and based on the bias voltage signal and the control command signal, a constant current control unit configured to generate a gate drive signal for the power converter.

20 Claims, 6 Drawing Sheets

Pre-Charge Sigal

VCC

CMD

PRE-CHARGE APPARATUS AND CONTROL METHOD

PRIORITY CLAIM

This application claims priority to Chinese Patent Application No. 202210225212.4, filed on Mar. 9, 2022, which is hereby incorporated by reference in its entirety.

TECHNICAL FIELD

The present invention relates to a pre-charge apparatus and control method, and, in particular embodiments, to a pre-charge apparatus for charging an energy storage capacitor in an electric vehicle.

BACKGROUND

As technologies evolve, electric vehicles have been widely adopted. A typical electric vehicle may include a power source (e.g., a rechargeable battery pack) and an inverter (e.g., a three-phase motor inverter). The rechargeable battery pack is configured to establish a high voltage bus for driving an electric machine through the inverter. An energy storage capacitor or a plurality of energy storage capacitors is employed to establish an input voltage bus for the inverter. The energy storage capacitor is coupled to the high voltage bus through a mechanical contact (e.g., a power relay).

During a shutdown mode of the electric vehicle, the rechargeable battery pack is isolated from the energy storage capacitor through opening the mechanical contract. Due to various safety requirements, the energy storage capacitor must be discharged within a specific time once the rechargeable battery pack is disconnected from the energy storage capacitor. When the electric vehicle is turned on, the energy storage capacitor has to be charged up to a voltage level approximately equal to the voltage on the high voltage bus before the power relay can be closed, otherwise a huge surge current can occur. The huge surge current may damage the power relay.

To reduce or eliminate the huge surge current, a pre-charge circuit including a current limit resistor and a low power pre-charge relay may be used to charge up the energy storage capacitor to a voltage level approximately equal to the voltage on the high voltage bus prior to closing the power relay.

In operation, the current limit resistor may cause reliability issues and unnecessary power losses. In addition, the current limit resistor is of a bulky size for handling the energy losses dissipated in the resistor. If the relay opens during the pre-charging time for any reasons, an arc could occur and damage the contacts of the relay. It would be desirable to have a simple apparatus to pre-charge the energy storage capacitor to reduce power consumption and improve reliability. The present disclosure addresses this need.

SUMMARY

These and other problems are generally solved or circumvented, and technical advantages are generally achieved, by preferred embodiments of the present disclosure which provide a pre-charge apparatus for charging an energy storage capacitor in an electric vehicle.

In accordance with an embodiment, an apparatus comprises a power converter configured to provide a constant current charge to a capacitor coupled to a high voltage bus through a mechanical contact, an isolation interface configured to receive a pre-charge signal on a primary side of the isolation interface, and convert the pre-charge signal into a bias voltage signal and a control command signal on a secondary side of the isolation interface, and based on the bias voltage signal and the control command signal, a constant current control unit configured to generate a gate drive signal for the power converter.

In accordance with another embodiment, a method comprises prior to closing a power relay between a high voltage bus and a capacitor, transferring a pre-charge control signal from a primary side of an isolation interface to a secondary side of the isolation interface, obtaining a bias voltage signal and a control command signal based on the pre-charge signal received at the secondary side of the isolation interface, based on the bias voltage signal and the control command signal, generating a gate drive signal to control a power conversion apparatus so as to provide a constant current charge to the capacitor, and closing the power relay after a voltage across the capacitor exceeds a predetermined voltage level.

In accordance with yet another embodiment, a system comprises a capacitor configured to be coupled to an input of an inverter, a mechanical contact coupled between a first terminal of the capacitor and a high voltage bus, and a constant current pre-charge module having a first terminal coupled to the high voltage bus, a second terminal coupled to a common node of the capacitor and the mechanical contact, and a third terminal coupled to a second terminal of the capacitor, wherein the constant current pre-charge module is configured to provide a constant current charge to the capacitor.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a pre-charge apparatus for charging an energy storage capacitor in an electric vehicle. The disclosure may also be applied, however, to a variety of power conversion systems. Hereinafter, various embodiments will be explained in detail with reference to the accompanying drawings.

Figure 1:
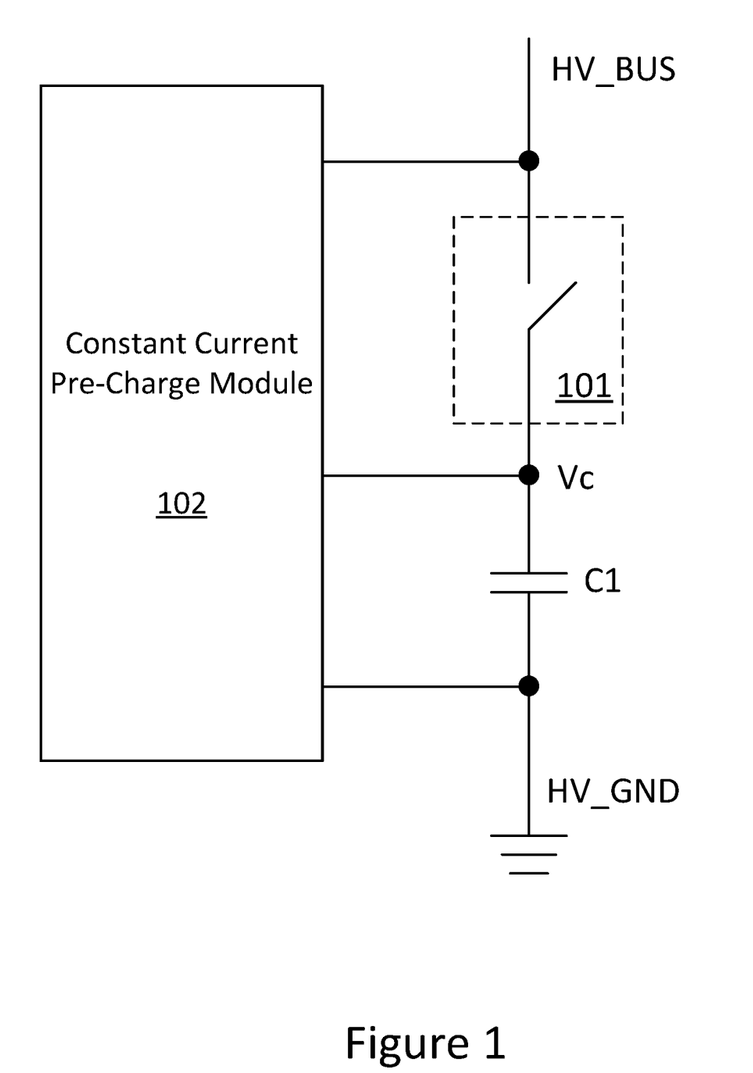
FIG. 1 illustrates a block diagram of a capacitor pre-charge system in accordance with various embodiments of the present disclosure.

FIG. 1 illustrates a block diagram of a capacitor pre-charge system in accordance with various embodiments of the present disclosure. The capacitor pre-charge system comprises a capacitor C1, a mechanical contact 101 and a constant current pre-charge module 102. The capacitor C1 is configured to be coupled to an input of an inverter (not shown). The capacitor C1 functions as an energy storage capacitor of the inverter. In some embodiments, the inverter a three-phase motor inverter configured to drive a motor in an electric vehicle. The mechanical contact 101 is coupled between a first terminal of the capacitor C1 and a high voltage bus (HV_BUS). The mechanical contact 101 may be implemented as a power relay. In some embodiments, the high voltage bus is coupled to a rechargeable battery pack of the electric vehicle. As shown in FIG. 1, a second terminal of the capacitor C1 is connected to ground. Throughout the description, this ground is alternatively referred to as a high voltage ground (HV_GND) as shown in FIG. 1.

The constant current pre-charge module 102 has a first terminal coupled to the high voltage bus, a second terminal coupled to a common node of the capacitor C1 and the mechanical contact 101, and a third terminal coupled to a second terminal of the capacitor C1. In some embodiments, the constant current pre-charge module 102 comprises a power converter, an isolation interface and a constant current control unit. The power converter is configured to provide a constant current charge to the capacitor C1. The detailed schematic diagram of the power converter will be described below with respect to FIG. 2. The isolation interface is configured to receive a pre-charge signal on a primary side of the isolation interface, and convert the pre-charge signal into a bias voltage signal and a control command signal on a secondary side of the isolation interface. The detailed schematic diagram of the isolation interface will be described below with respect to FIG. 3. The constant current control unit is configured to generate a gate drive signal for the power converter based on the bias voltage signal, the control command signal and a current sense signal indicative of a current flowing through the power converter. The detailed schematic diagram of the constant current pre-charge module will be described below with respect to FIG. 4.

In operation, during a shutdown mode of the electric vehicle, the rechargeable battery pack is isolated from the energy storage capacitor C1 through opening the mechanical contact 101. Due to safety requirements, the energy storage capacitor C1 is discharged within a specific time once the rechargeable battery pack is disconnected from the energy storage capacitor C1. When the electric vehicle is turned on, the constant current pre-charge module 102 is configured to charge the energy storage capacitor C1 up to a voltage level approximately equal to the voltage on the high voltage bus before the mechanical contact 101 is closed. During the process of charging C1, the constant current pre-charge module 102 is configured to provide a constant current charge to the capacitor C1.

One advantageous feature of having the capacitor pre-charge system shown in FIG. 1 is that the constant current pre-charge module 102 helps to improve reliability and reduce the physical size of the capacitor pre-charge circuit. In particular, a switching circuit is employed to generate a controllable current to charge the capacitor C1. The switching circuit is efficient, therefore reducing the physical size of the capacitor pre-charge circuit. Furthermore, in comparison with the conventional solutions, a semiconductor switch is used to replace the mechanical relay widely used in the conventional solutions. The replacement helps to solve the arcing issues caused by the mechanical relay. As a result, the reliability of the pre-charge circuit is improved. Furthermore, a peak current mode control scheme is employed to control the power converter. The peak current mode control scheme can respond any short circuit cycle by cycle and prevent the circuit from being damaged.

Figure 2:
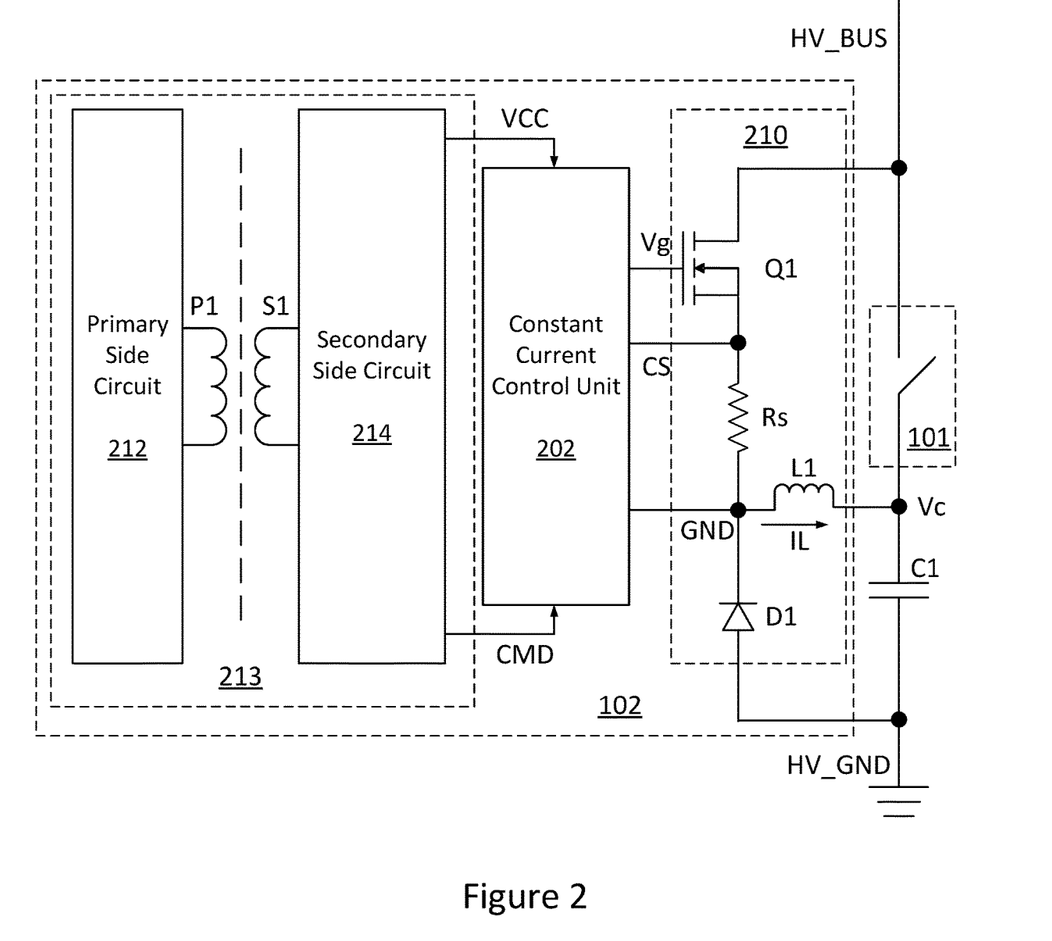
FIG. 2 illustrates a diagram of the constant current pre-charge module shown in FIG. 1 in accordance with various embodiments of the present disclosure.

FIG. 2 illustrates a diagram of the constant current pre-charge module shown in FIG. 1 in accordance with various embodiments of the present disclosure. The constant current pre-charge module 102 comprises a power converter, a constant current control unit 202 and an isolation interface 213.

The power converter comprises a switch Q1, a sense resistor Rs and a diode D1 connected in series between the high voltage bus HV_BUS and the high voltage ground HV_GND. The power converter further comprises an inductor L1 connected between a common node of the sense resistor Rs and the diode D1, and a common node of the capacitor C1 and the mechanical contact 101. The common node of Rs and D1 is a low voltage ground (GND) as shown in FIG. 2.

In some embodiments, the power converter is a buck converter. The power converter is configured to provide a constant current charge to the capacitor C1 coupled to the high voltage bus HV_BUS through the mechanical contact 101.

In accordance with an embodiment, the switch Q1 of FIG. 2 may be a metal oxide semiconductor field-effect transistor (MOSFET) device. Alternatively, the switch Q1 may be implemented as any suitable semiconductor devices such as bipolar junction transistor (BJT) devices, super junction transistor (SJT) devices, insulated gate bipolar transistor (IGBT) devices, gallium nitride (GaN) based power devices and/or the like.

It should be noted while FIG. 2 shows the switch Q1 is implemented as a single n-type transistor, a person skilled in the art would recognize there may be many variations, modifications and alternatives. For example, depending on different applications and design needs, the switch Q1 may be implemented as a p-type transistor. Furthermore, Q1 may be implemented as a plurality of switches connected in parallel. Moreover, a capacitor may be connected in parallel with one switch to achieve zero voltage switching (ZVS)/ zero current switching (ZCS).

It should further be noted while FIG. 2 shows D1 is employed as a freewheeling device, this is merely an example. A person skilled in the art would recognize there may be many variations, modifications and alternatives. For example, D1 may be replaced by a MOSFET device to further improve the efficiency of the power converter.

The isolation interface 213 comprises a primary winding P1, a secondary winding S1, a primary side circuit 212 and a secondary side circuit 214. The secondary winding S1 is magnetically coupled to the primary winding P1. The secondary winding S1 and the primary winding P1 form a transformer for transferring a pre-charge signal from the primary side to the secondary side. In addition, the transformer provides isolation between the primary side and the secondary side. The isolation provided by the transformer helps to connecting circuits with grounds (e.g., HV_GND and GND shown in FIG. 2) at different potentials.

As shown in FIG. 2, the primary winding P1 is connected to the primary side circuit 212. In some embodiments, the primary side circuit 212 is implemented as a high frequency oscillator. The secondary winding S1 is coupled to a secondary side circuit 214. In some embodiments, the secondary side circuit 214 comprises a first rectifier and a second rectifier.

In operation, a pre-charge signal is fed into the primary side of the isolation interface 213. The pre-charge signal is modulated by the primary side circuit 212. The modulated pre-charge signal is transferred to the secondary side through the primary winding P1 and the secondary winding S1. The first rectifier converts the received pre-charge signal into a bias voltage signal VCC. The second rectifier converts the received pre-charge signal into a control command signal CMD. As shown in FIG. 2, the bias voltage signal VCC and the control command signal CMD are fed into the constant current control unit 202.

As shown in FIG. 2, the constant current control unit 202 is configured to receive a current sense signal CS across the sense resistor Rs. The current sense signal CS is proportional to the current flowing through the inductor L1. Based on the bias voltage signal VCC, the control command signal CMD and the current sense signal CS, the constant current control unit 202 is configured to generate a gate drive signal Vg for the power converter.

Figure 3:
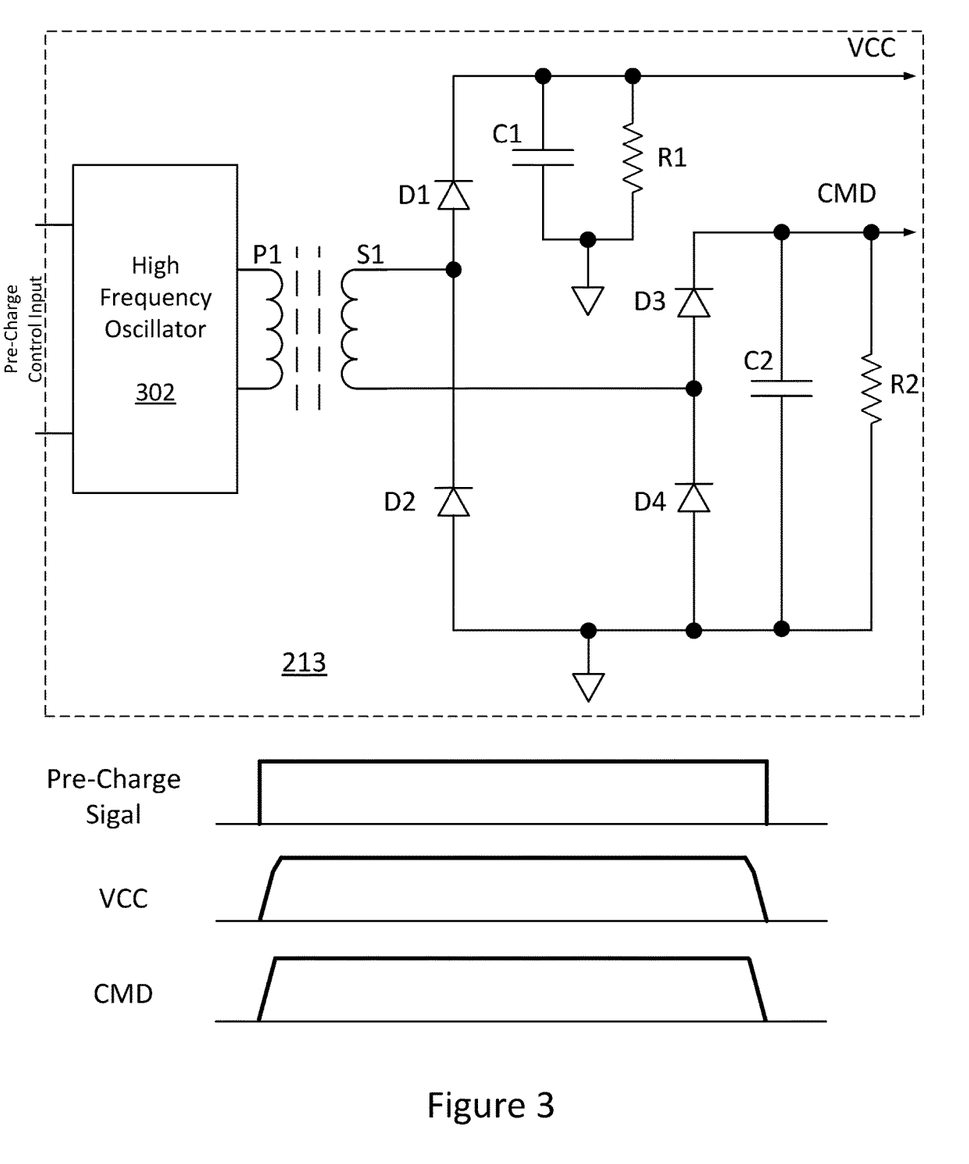
FIG. 3 illustrates an implementation of the isolation interface shown in FIG. 2 in accordance with various embodiments of the present disclosure.

FIG. 3 illustrates an implementation of the isolation interface shown in FIG. 2 in accordance with various embodiments of the present disclosure. The isolation interface 213 comprises a primary winding P1, a secondary winding S1, a primary side circuit and a secondary side circuit. The primary side circuit is implemented as a high frequency oscillator 302. The high frequency oscillator 302 is configured to receive a pre-charge signal. In some embodiments, the secondary side circuit comprises a first rectifier and a second rectifier.

In operation, both the power signal (e.g., VCC) and the pre-charge control signal (e.g., CMD) are extracted from single pre-charge control input. In particular, the high frequency oscillator 302 is configured to generate a high frequency oscillation voltage and applies it to the isolation transformer formed by P1 and S1. The first rectifier and the second rectifier form a signal receiver at the secondary side of the transformer. The signal receiver extracts both the power signal (VCC) and the pre-charge control signal (CMD). The power signal (VCC) is used to power the downstream constant current control unit 202, and the pre-charge control signal (CMD) is to turn on or off the constant current control unit 202. In other words, CMD is used to enable and disable the constant current control unit 202. Throughout the description, the power signal VCC may be alternatively referred to as a bias voltage signal. The pre-charge control signal CMD may be alternatively referred to as a control command signal.

As shown in FIG. 3, the first rectifier comprises a first diode D1 and a second diode D2 connected in series between a first signal bus and a ground bus. The common node of the first diode D1 and the second diode D2 is coupled to a first terminal of the secondary winding S1. The first signal bus is configured to generate the bias voltage signal VCC.

As shown in FIG. 3, the second rectifier comprises a third diode D3 and a fourth diode D4 connected in series between a second signal bus and the ground bus. The common node of the third diode D3 and the fourth diode D4 is coupled to the second terminal of the secondary winding S1. The second signal bus is configured to generate the control command signal CMD.

As shown in FIG. 3, a first capacitor C1 and a first resistor R1 are connected in parallel between the first signal bus and the ground bus. A second capacitor C2 and a second resistor R2 are connected in parallel between the second signal bus and the ground bus.

FIG. 3 further illustrates the pre-charge signal applied to the high frequency oscillator 302 is a pulse. The pre-charge signal is a combination of an energy signal and a control signal. After this pre-charge signal is transferred from the primary side to the secondary side, the first rectifier and the second rectifier convert the pre-charge signal into the bias voltage signal VCC and the control command signal CMD, respectively. As shown in FIG. 3, both bias voltage signal VCC and the control command signal CMD are in phase with the pre-charge signal.

It should be noted that the isolation interface shown in FIG. 3 is merely an exemplary structure and is not meant to limit the current embodiments. Other suitable isolation structures may alternatively be used. For example, VCC may be transferred from the primary side to the secondary side through a signal transformer. CMD may be transferred from the primary side to the secondary side through an opto-coupler.

Figure 4:
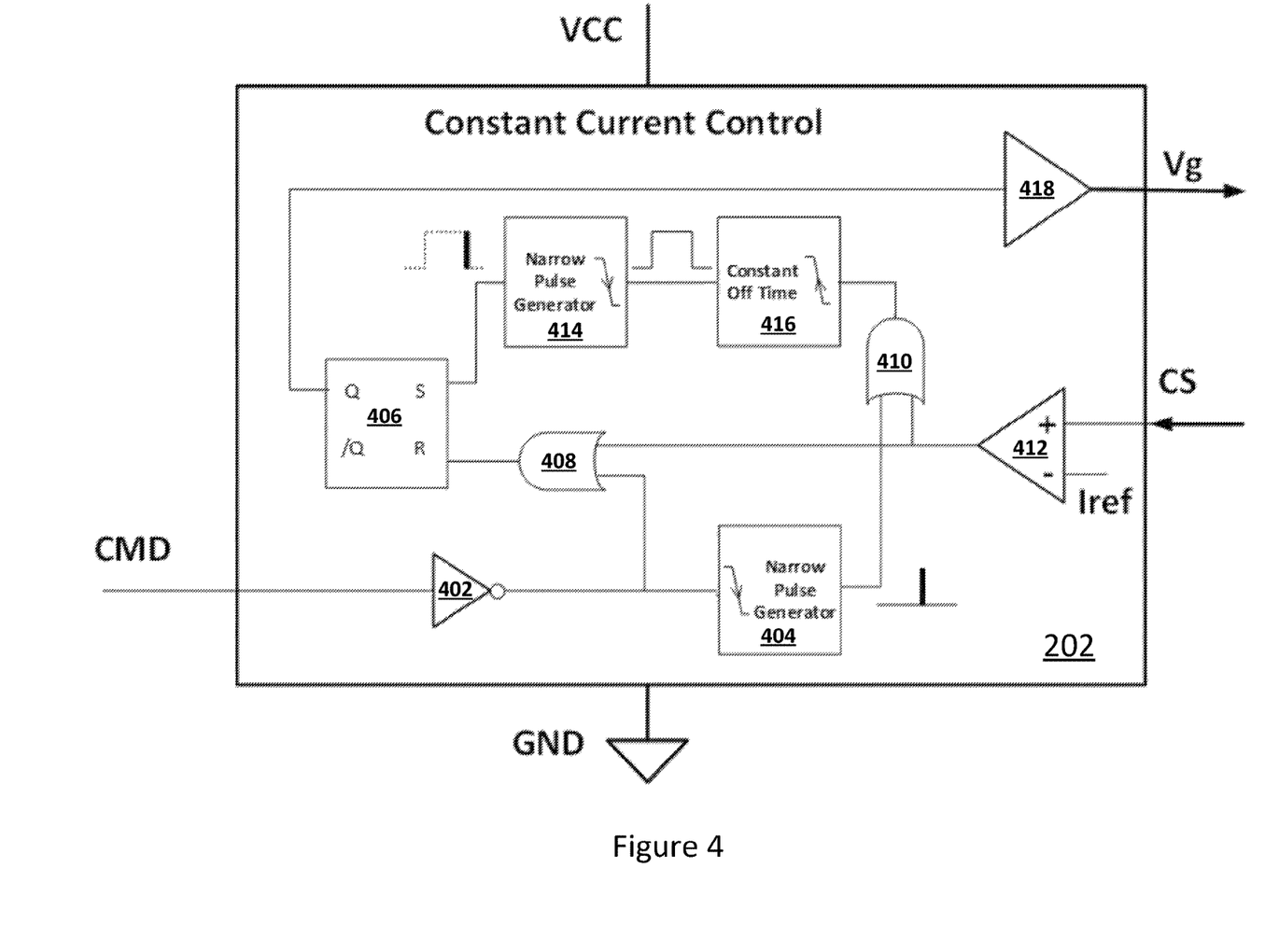
FIG. 4 illustrates a block diagram of the constant current control unit shown in FIG. 3 in accordance with various embodiments of the present disclosure.

FIG. 4 illustrates a block diagram of the constant current control unit shown in FIG. 3 in accordance with various embodiments of the present disclosure. The constant current control unit 202 comprises a first narrow pulse generator 404, an inverter 402, a comparator 412, a first AND gate 408, a second AND gate 410, a constant off time generator 416, a second narrow pulse generator 414, a flip-flop 406 and a buffer 418.

As shown in FIG. 4, the first narrow pulse generator 404 is configured to receive the control command signal CMD through the inverter 402, and generate a first narrow pulse. The comparator 412 is configured to receive a current sense signal CS indicative of a current flowing through the power converter (the current flowing through the inductor L1), compare the current sense signal with a predetermined current reference Iref, and generate a comparison result.

The first AND gate 408 has a first input configured to receive the control command signal CMD through the inverter 402, and a second input configured to receive the comparison result generated by the comparator 412. The second AND gate 410 has a first input configured to receive the comparison result generated by the comparator 412, and a second input configured to receive the first narrow pulse generated by the first narrow pulse generator 404.

The constant off time generator 416 is configured to receive an output signal of the second AND gate 410, and generate a constant off time for the switch (e.g., Q1 shown in FIG. 2) of the power converter. The second narrow pulse generator 414 is configured to receive the constant off time generated by the constant off time generator 416, and generate a second narrow pulse.

The flip-flop 406 has a set input configured to receive the second narrow pulse generated by the second narrow pulse generator 414, and a reset input configured to receive an output signal of the first AND gate 408. The flip-flop 406 is configured to generate the gate drive signal of Q1. As shown in FIG. 4, the buffer 418 is configured to receive the output signal of the flip-flop 406 and feed the gate drive signal into the switch of the power converter.

Figure 5:
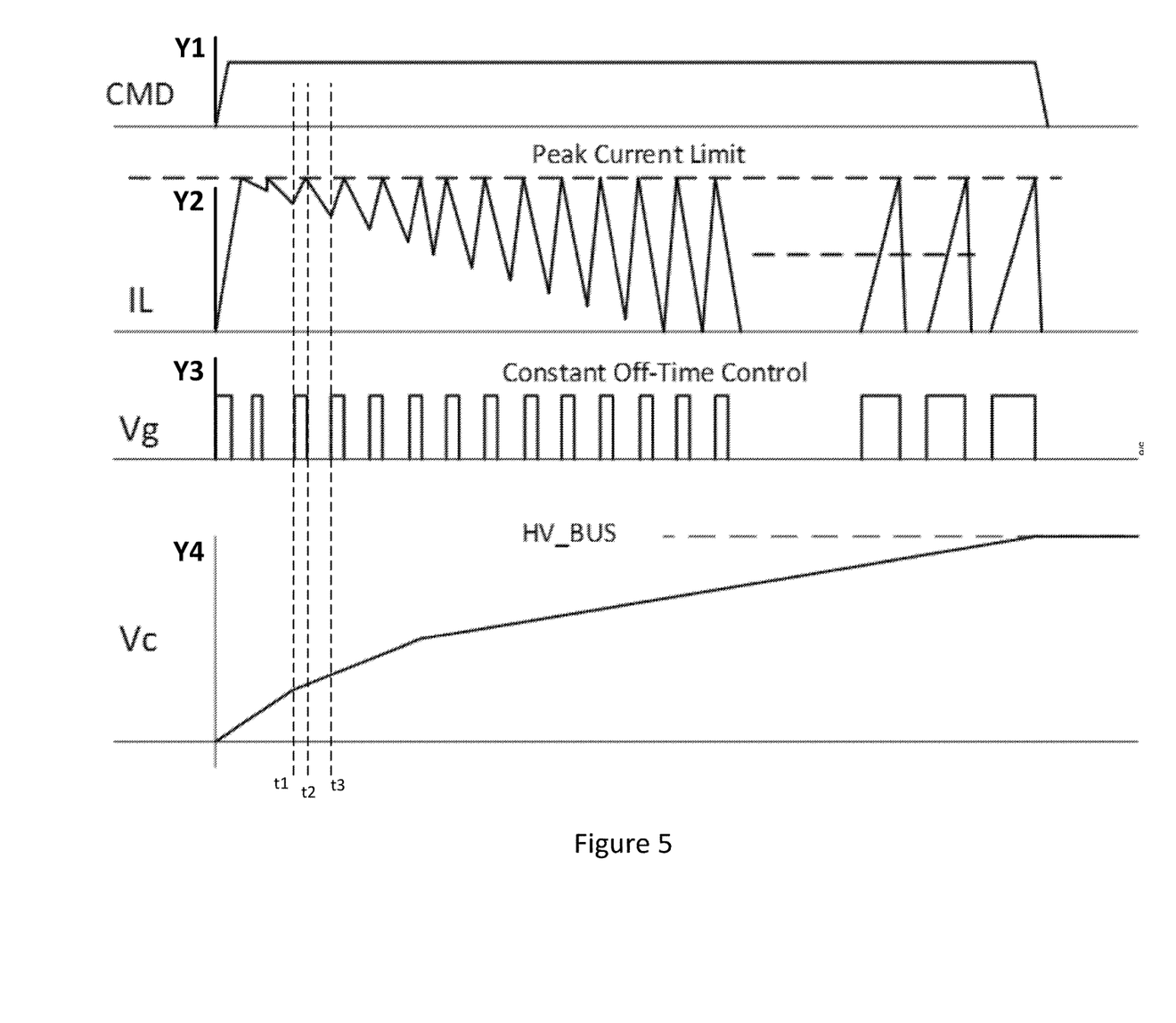
FIG. 5 illustrates various waveforms associated with the capacitor pre-charge system shown in FIG. 1 in accordance with various embodiments of the present disclosure.

FIG. 5 illustrates various waveforms associated with the capacitor pre-charge system shown in FIG. 1 in accordance with various embodiments of the present disclosure. The horizontal axis of FIG. 5 represents intervals of time. There may be four vertical axes. The first vertical axis Y1 represents the control command signal CMD. The second vertical axis Y2 represents the current flowing through the inductor L1 of the power converter. The third vertical axis Y3 represents the gate drive signal Vg applied to the gate of Q1. The fourth vertical axis Y4 represents the voltage Vc across the capacitor C1.

In response to the leading edge of the control command signal CMD, the gate drive signal Vg is applied to Q1. The current flowing through the inductor L1 increases in a linear manner to a predetermined current limit (peak current limit shown in FIG. 5). Once the current flowing through the inductor L1 exceeds the predetermined current limit, Q1 is turned off. The turn-off time of Q1 is controlled by the constant off time generator 416. This turn-on and turn-off of Q1 repeat until the voltage across the capacitor C1 reaches a voltage level approximately equal to the voltage on the high voltage bus HV_BUS.

In order to better illustrate the operating principle of the power converter, one switching cycle of the power converter is discussed below. At t1, the gate drive signal Vg changes from a logic low state to a logic high state. In response to this change, Q1 is turned on. The current flowing through the inductor L1 increases in a linear manner from t1 to t2. The current flowing through the inductor L1 charges C1. As a result, the voltage Vc across C1 increases accordingly.

At t2, the current flowing through the inductor L1 reaches the predetermined current limit. Referring back to FIG. 4, the output of the comparator 412 generates a logic high signal to reset the flip-flop 406. As a result, the gate drive signal Vg changes from a logic high state to a logic low state. In response to this change, Q1 is turned off. The current flowing through the inductor L1 decrease in a linear manner from t2 to t3. The duration from t2 to t3 is determined by the constant off time generator 416. At t3, Q1 is turned on again. This process repeats until the voltage across the capacitor C1 reaches a voltage level approximately equal to the voltage on the high voltage bus HV_BUS.

Figure 6:
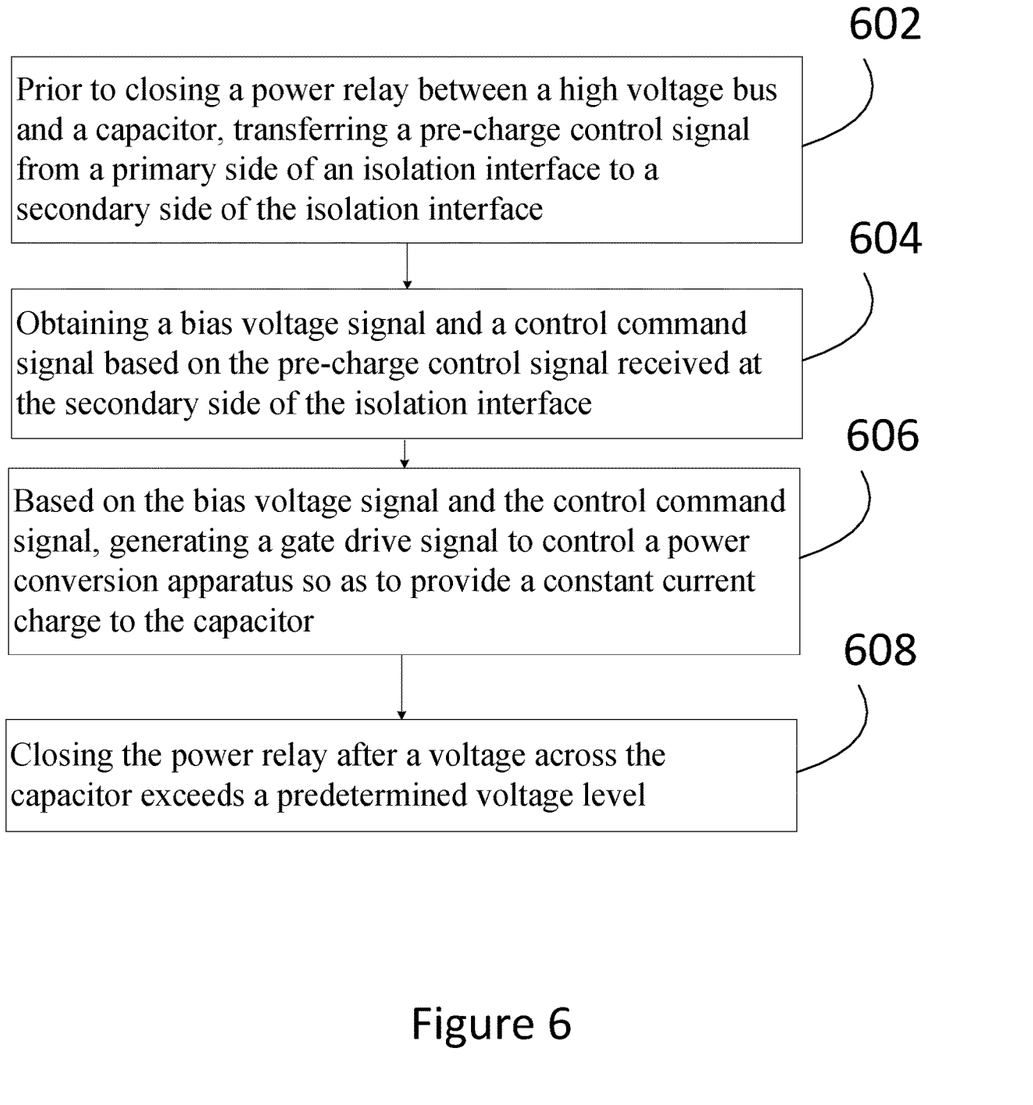
FIG. 6 illustrates a flow chart of operating the capacitor pre-charge system shown in FIG. 1 in accordance with various embodiments of the present disclosure.

FIG. 6 illustrates a flow chart of operating the capacitor pre-charge system shown in FIG. 1 in accordance with various embodiments of the present disclosure. This flowchart shown in FIG. 6 is merely an example, which should not unduly limit the scope of the claims. One of ordinary skill in the art would recognize many variations, alternatives, and modifications. For example, various steps illustrated in FIG. 6 may be added, removed, replaced, rearranged and repeated.

Referring back to FIG. 1, a capacitor C1 is configured to be coupled to an input of an inverter (not shown). The capacitor C1 is coupled to a high voltage bus HV_BUS through a mechanical contact (e.g., a power relay). A constant current pre-charge module 102 has a first terminal coupled to the high voltage bus, a second terminal coupled to a common node of the capacitor and the mechanical contact, and a third terminal coupled to a second terminal of the capacitor. During a shutdown mode (e.g., a shutdown mode of an electric vehicle), the capacitor C1 is disconnected from the high voltage bus through opening the mechanical contact. The capacitor C1 is discharged through a suitable discharge circuit. Prior to leaving the shutdown mode and entering into a normal operating mode, the constant current pre-charge module 102 is configured to provide a constant current charge to the capacitor C1 until the voltage across the capacitor C1 reaches a level approximately equal to the voltage on the high voltage bus HV_BUS.

At step 602, prior to closing a power relay between a high voltage bus and a capacitor, a pre-charge control signal is transferred from a primary side of an isolation interface to a secondary side of the isolation interface.

At step 604, based on the pre-charge signal received at the secondary side of the isolation interface, a bias voltage signal and a control command signal are obtained.

At step 606, based on the bias voltage signal and a control command signal, a gate drive signal is generated to control a power conversion apparatus so as to provide a constant current charge to the capacitor.

At step 608, the power relay is closed after a voltage across the capacitor exceeds a predetermined voltage level.

The method further comprises discharging the capacitor after a power source is disconnected from the capacitor through opening the power relay. The method further comprises obtaining the bias voltage signal through a first rectifier, and obtaining the control command signal through a second rectifier.

The isolation interface comprises a transformer. A primary winding of the transformer is coupled to a high frequency oscillator having an input configured to receive the pre-charge control signal. A first terminal of the secondary winding of the transformer is coupled to an input of the first rectifier. A second terminal of the secondary winding of the transformer is coupled to an input of the second rectifier. The power conversion apparatus is a buck converter.

The method further comprises applying a peak current control scheme to the power conversion apparatus to achieve the constant current charge.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
a power converter configured to provide a constant current charge to a capacitor coupled to a high voltage bus through a mechanical contact;
an isolation interface configured to receive a pre-charge signal on a primary side of the isolation interface, and convert the pre-charge signal into a bias voltage signal and a control command signal on a secondary side of the isolation interface, wherein the isolation interface comprises a primary winding and a secondary winding magnetically coupled to the primary winding; and
based on the bias voltage signal and the control command signal, a constant current control unit configured to generate a gate drive signal for the power converter.

2. The apparatus of claim 1, wherein the power converter comprises:
a switch, a sense resistor and a diode connected in series between the high voltage bus and a first terminal of the capacitor; and
an inductor connected between a common node of the sense resistor and the diode, and a second terminal of the capacitor.

3. The apparatus of claim 2, wherein:
the first terminal of the capacitor is coupled to a high voltage ground; and
the second terminal of the capacitor is coupled to the high voltage bus through the mechanical contact.

4. The apparatus of claim 2, wherein:
the constant current control unit is configured to receive a current sense signal across the sense resistor.

5. The apparatus of claim 1, wherein:
the primary winding is coupled to a high frequency oscillator; and
the secondary winding is coupled to a first rectifier and a second rectifier.

6. The apparatus of claim 5, wherein:
the first rectifier comprises a first diode and a second diode connected in series between a first signal bus and a ground bus, wherein a common node of the first diode and the second diode is coupled to a first terminal of the secondary winding, and the first signal bus is configured to generate the bias voltage signal; and
the second rectifier comprises a third diode and a fourth diode connected in series between a second signal bus and the ground bus, wherein a common node of the third diode and the fourth diode is coupled to a second terminal of the secondary winding, and the second signal bus is configured to generate the control command signal.

7. The apparatus of claim 6, further comprising:
a first capacitor and a first resistor connected in parallel between the first signal bus and the ground bus; and
a second capacitor and a second resistor connected in parallel between the second signal bus and the ground bus.

8. The apparatus of claim 1, wherein the constant current control unit comprises:
a first narrow pulse generator configured to receive the control command signal through an inverter, and generate a first narrow pulse;
a comparator configured to receive a current sense signal indicative of a current flowing through the power converter, compare the current sense signal with a predetermined current reference, and generate a comparison result;
a first AND gate having a first input configured to receive the control command signal through the inverter and a second input configured to receive the comparison result generated by the comparator;
a second AND gate having a first input configured to receive the comparison result generated by the comparator and a second input configured to receive the first narrow pulse generated by the first narrow pulse generator;
a constant off time generator configured to receive an output signal of the second AND gate, and generate a constant off time for the power converter;
a second narrow pulse generator configured to receive the constant off time generated by the constant off time generator, and generate a second narrow pulse;
a flip-flop having a set input configured to receive the second narrow pulse generated by the second narrow pulse generator and a reset input configured to receive an output signal of the first AND gate; and
a buffer configured to receive an output signal of the flip-flop, and generate the gate drive signal for the power converter.

9. A method comprising:
prior to closing a power relay between a high voltage bus and a capacitor, transferring a pre-charge control signal from a primary side of an isolation interface to a secondary side of the isolation interface, wherein the isolation interface comprises a primary winding and a secondary winding magnetically coupled to the primary winding;
obtaining a bias voltage signal and a control command signal based on the pre-charge control signal received at the secondary side of the isolation interface;
based on the bias voltage signal and the control command signal, generating a gate drive signal to control a power conversion apparatus so as to provide a constant current charge to the capacitor; and
closing the power relay after a voltage across the capacitor exceeds a predetermined voltage level.

10. The method of claim 9, further comprising:
discharging the capacitor after a power source is disconnected from the capacitor through opening the power relay.

11. The method of claim 9, further comprising:
obtaining the bias voltage signal through a first rectifier; and
obtaining the control command signal through a second rectifier.

12. The method of claim 11, wherein the isolation interface comprises a transformer comprising the primary winding and the secondary winding, and wherein:
the primary winding of the transformer is coupled to a high frequency oscillator having an input configured to receive the pre-charge control signal;
a first terminal of the secondary winding of the transformer is coupled to an input of the first rectifier; and
a second terminal of the secondary winding of the transformer is coupled to an input of the second rectifier.

13. The method of claim 12, wherein:
the first rectifier comprises a first diode and a second diode connected in series between a first signal bus and a ground bus, and wherein a common node of the first diode and the second diode is coupled to the first terminal of the secondary winding of the transformer, and the first signal bus is configured to generate the bias voltage signal; and the second rectifier comprises a third diode and a fourth diode connected in series between a second signal bus and the ground bus, and wherein a common node of the third diode and the fourth diode is coupled to the second terminal of the secondary winding of the transformer, and the second signal bus is configured to generate the control command signal.

14. The method of claim 9, wherein:
the power conversion apparatus is a buck converter.

15. The method of claim 14, further comprising:
applying a peak current control scheme to the power conversion apparatus to achieve the constant current charge.

16. A system comprising:
a capacitor configured to be coupled to an input of an inverter;
a mechanical contact coupled between a first terminal of the capacitor and a high voltage bus; and
a constant current pre-charge module having a first terminal coupled to the high voltage bus, a second terminal coupled to a common node of the capacitor and the mechanical contact, and a third terminal coupled to a second terminal of the capacitor, wherein the constant current pre-charge module is configured to provide a constant current charge to the capacitor, wherein the constant current pre-charge module comprises an isolation interface formed by a primary winding and a secondary winding magnetically coupled to the primary winding.

17. The system of claim 16, wherein the constant current pre-charge module comprises:
a power converter configured to provide the constant current charge to the capacitor;
the isolation interface configured to receive a pre-charge signal on a primary side of the isolation interface, and convert the pre-charge signal into a bias voltage signal and a control command signal on a secondary side of the isolation interface; and a constant current control unit configured to generate a gate drive signal for the power converter based on the bias voltage signal, the control command signal and a current sense signal indicative of a current flowing through the power converter.

18. The system of claim 17, wherein the power converter comprises:
a switch, a sense resistor and a diode connected in series between the high voltage bus and the first terminal of the capacitor; and
an inductor connected between a common node of the sense resistor and the diode, and the second terminal of the capacitor.

19. The system of claim 17, wherein the isolation interface comprises:
the primary winding coupled to a high frequency oscillator;
the secondary winding coupled to a first rectifier and a second rectifier, and wherein the secondary winding is magnetically coupled to the primary winding;
a first capacitor and a first resistor connected in parallel between outputs of the first rectifier; and
a second capacitor and a second resistor connected in parallel between outputs of the second rectifier.

20. The system of claim 19, wherein:
the first rectifier comprises a first diode and a second diode connected in series between a first signal bus and a ground bus, wherein a common node of the first diode and the second diode is coupled to a first terminal of the secondary winding, and the first signal bus is configured to generate the bias voltage signal; and
the second rectifier comprises a third diode and a fourth diode connected in series between a second signal bus and the ground bus, wherein a common node of the third diode and the fourth diode is coupled to the second terminal of the secondary winding, and the second signal bus is configured to generate the control command signal.

* * * * *